United States Patent [19]

Stolz, II

[11] Patent Number: 4,893,531

[45] Date of Patent: Jan. 16, 1990

[54] WELDING ACCESSORY APPARATUS

[76] Inventor: Harry P. Stolz, II, 768 E. Fifth Ave., Durango, Colo. 81301

[21] Appl. No.: 260,744

[22] Filed: Oct. 21, 1988

[51] Int. Cl.[4] .............................................. B25B 33/00
[52] U.S. Cl. ........................................ 81/487; 401/8; 294/25; 30/298
[58] Field of Search ............ 81/487; 30/298; 294/25; 401/6-8; 228/57

[56] References Cited

U.S. PATENT DOCUMENTS

| 892,812 | 7/1908 | Day | 294/25 |
|---|---|---|---|
| 1,286,610 | 12/1918 | Harriman | 294/25 |
| 1,879,489 | 9/1932 | Ray | 401/8 |
| 2,184,130 | 12/1939 | Tizio | 401/8 |
| 3,596,964 | 8/1971 | Zazzara | 294/25 |
| 3,666,372 | 5/1972 | Lipkowski | 401/8 |
| 3,913,646 | 10/1975 | Grayson | 294/25 |

*Primary Examiner*—Roscoe V. Parker
*Attorney, Agent, or Firm*—Henderson & Sturm

[57] ABSTRACT

A welding accessory apparatus (10) for the selective manipulation and feeding of filler rod (100) by a welder; wherein, the apparatus (10) includes a ring member (13) having a raised apertured attachment member (15) equipped with a resilient insert member (20) having a feeding opening (21) formed therein; wherein, the feeding opening (21) is dimensioned to allow the incremental passage of a filter rod (100) through the apparatus (10) by the manipulation of the welder's thumb (51) and fingers (50).

3 Claims, 1 Drawing Sheet

WELDING ACCESSORY APPARATUS

TECHNICAL FIELD

This invention relates in general to a welding accessory, and in particular to a welding accessory which is disposed on a finger to aid in the advancement of a filler rod while welding.

BACKGROUND OF THE INVENTION

This invention was the subject matter of Document Disclosure Program Registration No. 188581 which was filed in the U.S. Pat. and Trademark Office on March 5, 1988.

As can be seen by reference to the following U.S. Pat. Nos: 3,596,964; 3,666,372; and, 3,913,646 the prior art is replete with myriad and diverse finger mounted support apparatus that will accept diverse articles to facilitate the usage of these diverse articles by an individual.

While all of the aforementioned prior art constructions are more than adequate for the specialized purpose for which they have been specifically designed; these devices are neither designed nor adapted to fulfill the needs that are satisfied by the subject matter of the present invention.

In the T.I.G. and oxeyacetylene welding processes the welder commonly employs a filler rod that is approximately 30 inches long in its unconsumed state. Needless to say, this elongated thin strand of filler material is very difficult to handle, manipulate and maintain by the welder at a desired location over an extended period of time during the welding process.

In view of the foregoing situation there has existed a longstanding need among welders to have a welding accessory that will allow the welder to retain control and position the feeding of the filler rod as the weld joint is being completed; and, the provision of such a device is the stated objective of this invention.

SUMMARY OF THE INVENTION

The apparatus that forms the basis of the present invention comprises a finger encircling unit and a friction unit. The finger encircling unit comprises in general: a split cylindrical ring member dimensioned to fit onto the index finger of a user. The diameter of the ring member is usually such that the finger encircling unit will become frictionally engaged at the first joint of the finger.

The finger encircling unit further includes a raised member comprising a thin attachment element which outwardly projects from the surface of the finger encircling unit. This attachment element includes an aperture whose opening is disposed generally perpendicular to the finger accommodating opening of the finger encircling unit.

The friction unit comprises a rubberized insertion member dimensioned to be deployed through the aperture of the projecting member of the finger encircling unit. The insertion member has its own discrete central aperture of a diameter dimensioned to allow a typical welding filler rod pass there through.

In addition, the insertion member is fabricated from a material such as rubber or the like that the insertion member will frictionally engage a filler rod and allow the controlled feeding of the filler rod relative to the friction unit and the finger encircling unit by the selective manipulation of the users thumb and the finger bearing the finger encircling.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings, wherein.

BEST MODE FOR CARRYING OUT THE INVENTION

Figure 1:
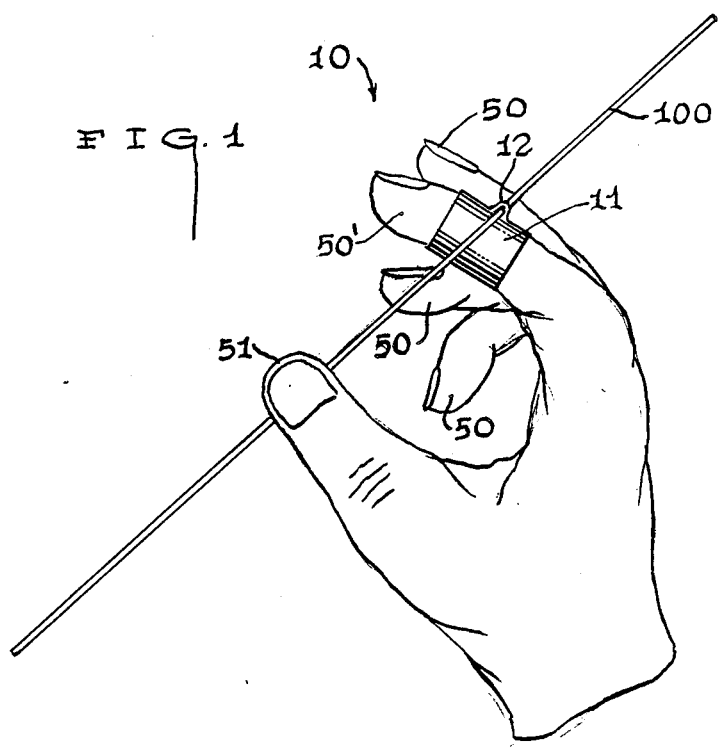
FIG. 1 is a perspective view of the present invention.

As can be seen by reference to the drawings and in particular to FIG. 1, the apparatus that forms the basis of the present invention involves a welding accessory apparatus for advancing an elongated rod (100), that is designated generally by the reference numeral (10). The apparatus (10) comprises in general: a finger encircling unit (11) and a friction unit (12).

Figure 2:
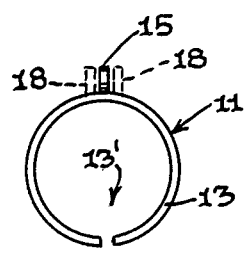
FIG. 2 is a side view showing the ring unit and the projecting member.
Figure 3:
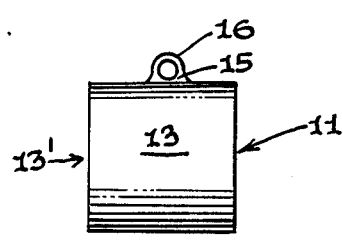
FIG. 3 is a front plan view showing the ring unit and the projecting member.

As shown in FIGS. 2 and 3, the finger encircling unit (11) comprises a split cylindrical ring member (13) fabricated from a generally rigid material and dimensioned to slide onto an index finger of an individual and to become frictionally engaged to the users finger (50) proximate the first joint.

Furthermore, the finger encircling unit (11) includes a raised attachment member (15) which projects radially outwardly from the ring member (13). The attachment member (15) is provided with a central aperture (16); wherein the axis of the central aperture (16) is disposed generally perpendicular to the axis of the ring member opening (13'). It should also be noted at this juncture that while the raised attachment member (15) is depicted as a single apertured ear element in FIGS. 1 thru 4; as can be seen by reference to FIG. 2, this invention also contemplates the use of a pair of aligned apertured ear elements (18) depicted in phantom to serve as the raised attachment member (15).

Figure 5:
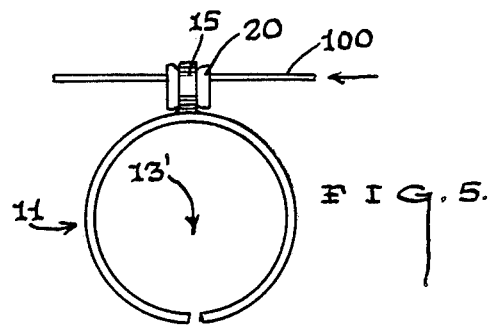
Figure 4:
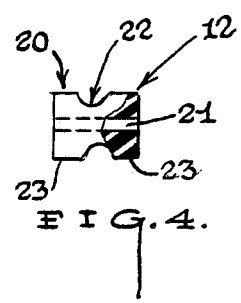
FIG. 4 is an isolated partial cross-sectional view showing the gripping unit; and, FIG. 5 is a side plan view of the apparatus.

As can best be appreciated by reference to FIGS. 4 and 5, the friction unit (12) comprises a contoured resilient insert member (20) having a central feeding opening (21) disposed along its longitudinal axis and a peripheral recess (22) disposed proximate its mid-point; wherein, the ends (23) of the resilient insert member (20) have a diameter that is greater than the central aperture (16) in the raised attachment member (15).

In addition, the peripheral recess (22) of the insert member (20) has a diameter approximately equal to the central aperture (16) of the attachment member (15) such that the insert member (20) may be captively engaged by the attachment member (15).

As can best be appreciated by reference to FIGS. 1 and 5, the filler rod (100) is dimensioned to pass through the central feeding opening (21) of the friction unit (12) by the selective manipulation of the users thumb (51) and fingers (50) relative to the finger (50') upon which the welding accessory apparatus (10) is mounted.

When a welder wishes to advance the filler rod (10) relative to the apparatus (10), the welder will grasp the periphery of the filler rod (100) with the thumb and one of their unencumbered fingers to incrementally advance the filler rod (100) in a well recognized fashion.

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A welding accessory apparatus for the manipulation, positioning and feeding of an elongated filler rod during the welding process wherein the apparatus comprises:
    a finger encircling unit including a ring member adapted to engage one of a welders fingers; wherein, the ring member is provided with at least one raised attachment member which projects radially outwardly from the ring member and has a central aperture formed therein; wherein, the axis of the said central aperture is disposed generally perpendicular to the axis of said ring member; and,
    a friction unit operatively associated with said finger encircling unit wherein the friction unit comprises: a resilient insert member adapted to be received in said raised attachment member.

2. The apparatus as in claim 1 wherein said resilient insert member is further provided with a feeding opening which is dimensioned to accept the passage of said elongated filler rod.

3. The apparatus as in claim 2 wherein said resilient insert member is further provided with a peripheral recess having a diameter that is approximately equal to the diameter of the central aperture in said attachment member.

* * * * *